United States Patent
Da Silva et al.

(10) Patent No.: US 8,977,027 B2
(45) Date of Patent: Mar. 10, 2015

(54) DUAL MODALITY IMAGING INCLUDING QUALITY METRICS

(75) Inventors: Angela Da Silva, Danville, CA (US); Horace Hines, San Jose, CA (US); Lingxiong Shao, Saratoga, CA (US); Hongjie Liang, San Jose, CA (US); Anna Exner, Aachen (DE); Andreas Goedicke, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 126 days.

(21) Appl. No.: 13/817,150

(22) PCT Filed: Aug. 17, 2011

(86) PCT No.: PCT/IB2011/053636
§ 371 (c)(1),
(2), (4) Date: Feb. 15, 2013

(87) PCT Pub. No.: WO2012/025855
PCT Pub. Date: Mar. 1, 2012

(65) Prior Publication Data
US 2013/0142411 A1 Jun. 6, 2013

Related U.S. Application Data

(60) Provisional application No. 61/376,876, filed on Aug. 25, 2010.

(51) Int. Cl.
G06K 9/00 (2006.01)
G06T 11/00 (2006.01)
G06T 7/00 (2006.01)

(52) U.S. Cl.
CPC ............. *G06T 11/003* (2013.01); *G06T 11/008* (2013.01); *G06T 2207/10084* (2013.01); *G06T 7/0028* (2013.01); *G06T 2207/30048* (2013.01)
USPC .............................................. 382/131; 705/2

(58) Field of Classification Search
None
See application file for complete search history.

(56) References Cited

U.S. PATENT DOCUMENTS 5,970,182 A 10/1999 Goris
6,266,453 B1 7/2001 Hibbard et al.
(Continued)

FOREIGN PATENT DOCUMENTS

EP 1426903 A2 6/2004
WO 03105069 A1 12/2003
(Continued)

OTHER PUBLICATIONS

Chen, J., et al.; Automated quality control of emission-transmission misalignment for attenuation correction in myocardial perfusion imaging with SPECT-CT systems; 2006; American Society of Nuclear Cardiology; pp. 43-49.
(Continued)

*Primary Examiner* — Hadi Akhavannik (57) ABSTRACT

An anatomical image data set and an emission image data set are acquired for a subject. An attenuation map is generated from the anatomical image data set. The emission image data set is reconstructed to generate an emission image. The reconstructing includes correcting for attenuation of emission radiation in the subject using the attenuation map. A value is calculated for a quality assurance (QA) metric quantifying alignment of the attenuation map with the emission image. The emission image is displayed or printed together with the calculated quality assurance metric. In some embodiments, prior to the reconstructing the attenuation map is registered with the emission image data set by performing a global rigid registration followed by a local non-rigid registration of a region of interest.

19 Claims, 4 Drawing Sheets

(56) References Cited

U.S. PATENT DOCUMENTS

| | | |
|---|---|---|
| 7,020,311 B2 | 3/2006 | Breeuwer |
| 7,639,896 B2 | 12/2009 | Sun et al. |
| 2004/0122790 A1 | 6/2004 | Walker et al. |
| 2006/0235294 A1 | 10/2006 | Florin et al. |
| 2008/0052112 A1* | 2/2008 | Zahlmann et al. ............ 705/2 |
| 2009/0087065 A1 | 4/2009 | DaSilva et al. |
| 2012/0275677 A1* | 11/2012 | Bower et al. ............ 382/131 |

FOREIGN PATENT DOCUMENTS

| | | |
|---|---|---|
| WO | 2007113704 A2 | 10/2007 |
| WO | 2009065079 A2 | 5/2009 |
| WO | 2009090572 A2 | 7/2009 |
| WO | WO 2009138898 * | 11/2009 |
| WO | 2010032168 A2 | 3/2010 |

OTHER PUBLICATIONS

Ghafarian, P., et al.; Quantification of PET and CT Data Misalignment Errors in Cardiac PET/CT: Clinical and Phantom Studies; 2009; IEEE; pp. 1-4.

* cited by examiner

DUAL MODALITY IMAGING INCLUDING QUALITY METRICS

CROSS REFERENCE TO RELATED APPLICATIONS

This application is a national filing of PCI application Serial No. PCT/IB2011/053636, filed Aug. 17, 2011, published as WO 2012/025855 A1 on Mar. 1, 2012, which claims the benefit of U.S. provisional application Ser. No. 61/376,876 filed Aug. 25, 2010, which is incorporated herein by reference.

The following relates to the emission imaging arts, medical imaging arts, dual modality imaging arts, and related arts.

Emission imaging techniques such as positron emission tomography (PET) or single photon emission computed tomography (SPECT) entail administering a radioactive substance (e.g., a radiopharmaceutical) to a subject and generating a map of the distribution of the radioactive substance in the subject based on emission measurements. Such techniques advantageously can provide functional information, and are used in application such as functional cardiac imaging.

Emission imaging is complementary to anatomical imaging techniques such as transmission computed tomography (CT) or magnetic resonance (MR) imaging, as the former provides functional information pertaining to anatomical structures delineated by the latter. Additionally, it has been recognized that anatomical information provided by the CT or MR images can provide an attenuation (or, equivalently, absorption) map to account for attenuation (or, equivalently, absorption) of emissions from the radioactive substance in the subject. CT directly measures attenuation, and accordingly conversion of a CT image to an attenuation map is straightforward (e.g., correcting for differences in the absorption of x-rays used in the CT versus 511 keV photons used in PET). To derive an attenuation map from an MR image, voxels of the MR image are suitably replaced by attenuation values based on identification of tissue type. This latter approach can also be used to construct an absorption map from a CT image. Using such an attenuation map, the effect of attenuation on the emission data can be accounted for in order to reconstruct a more accurate emission image.

Correcting emission images for absorption based on corresponding anatomical images is beneficial if the anatomical image is well aligned spatially with the emission image. However, misalignment between the emission and anatomical images can result in artifacts in the emission image corrected for absorption. In the illustrative case of cardiac imaging (or other imaging of the torso region), substantial artifacts can result if the absorption correction misidentifies lung voxels as tissue voxels, or vice versa. This is because absorption by the lung region (which is mostly air) is much lower than absorption by tissue. Misidentification of tissue/bone voxels is similarly problematic.

In typical clinical practice, a doctor requests a PET or SPECT image for a patient. The requested imaging procedure is scheduled and subsequently performed by a radiologist or other imaging technician, who typically performs both the imaging data acquisition and the subsequent image reconstruction processing (the latter being performed in conjunction with a computer or the like). Usually, the radiologist or other imaging technician performs an initial emission image reconstruction without correction for absorption, and visually compares the uncorrected emission image with the anatomical image (or the attenuation map generated therefrom) by an image fusion technique or the like. If the match is close, the radiologist or other imaging technician goes ahead with the attenuation-corrected reconstruction using the anatomical image to generate the attenuation map. If there is substantial misalignment, then the radiologist or other imaging technician may perform some manual image registration, for example by shifting the anatomical image to better align with the emission image, and then perform the attenuation-corrected reconstruction using the registered attenuation map.

If the radiologist or other imaging technician does a poor job of manual image registration, or neglects entirely to perform the manual image registration when there is substantial misalignment, then the final attenuation-corrected emission image may include substantial artifacts. On the other hand, the final image may be of high quality even if no image registration is performed, if the as-acquired emission and anatomical image datasets were already well-aligned.

The physician ultimately receives the final attenuation-corrected emission image for clinical review. The clinical value that the physician places on this image depends on the physician's assessment of its reliability. However, reliability of the image is dependent (at least in part) upon the accuracy of the attenuation correction, and the physician has no basis for assessing that accuracy.

The following provides new and improved apparatuses and methods as disclosed herein.

In accordance with one disclosed aspect, a method comprises: generating an attenuation map from an anatomical image data set acquired of a subject; reconstructing an emission image data set acquired of a subject to generate an emission image, the reconstructing including correcting for attenuation of emission radiation in the subject using the attenuation map; calculating a value for a quality assurance metric quantifying alignment of the attenuation map with the emission image; and displaying or printing the emission image together with the calculated quality assurance metric.

In accordance with another disclosed aspect, an apparatus comprises data processing electronics configured to perform a method including: generating an attenuation map from an anatomical image data set acquired for a subject; reconstructing an emission image data set acquired for the subject to generate an emission image, the reconstructing including correcting for attenuation of emission radiation in the subject using the attenuation map; calculating a value for a quality assurance metric quantifying alignment of the attenuation map with the emission image; and constructing a data unit comprising the emission image and metadata representing the calculated quality assurance metric.

In accordance with another disclosed aspect, a storage medium stores instructions executable by data processing electronics to perform a method including: generating an initial emission image by reconstructing an emission image data set acquired for the subject; generating an attenuation map from an anatomical image data set acquired for a subject, the generating including registering with the initial emission image one of (i) an anatomical image reconstructed from the anatomical image data set and (ii) the attenuation map, the registering including performing a global rigid registration followed by a local non rigid registration of a region of interest; and reconstructing the emission image data set to generate an attenuation corrected emission image, the reconstructing including correcting for attenuation of emission radiation in the subject using the generated attenuation map.

One advantage resides in more accurate alignment between an emission image and the attenuation map, and consequent generation of a more accurate attenuation-corrected emission image.

Another advantage resides providing a rational basis by which a physician may assess the clinical value of an attenuation-corrected emission image.

Further advantages will be apparent to those of ordinary skill in the art upon reading and understanding the following detailed description.

Figure 1:
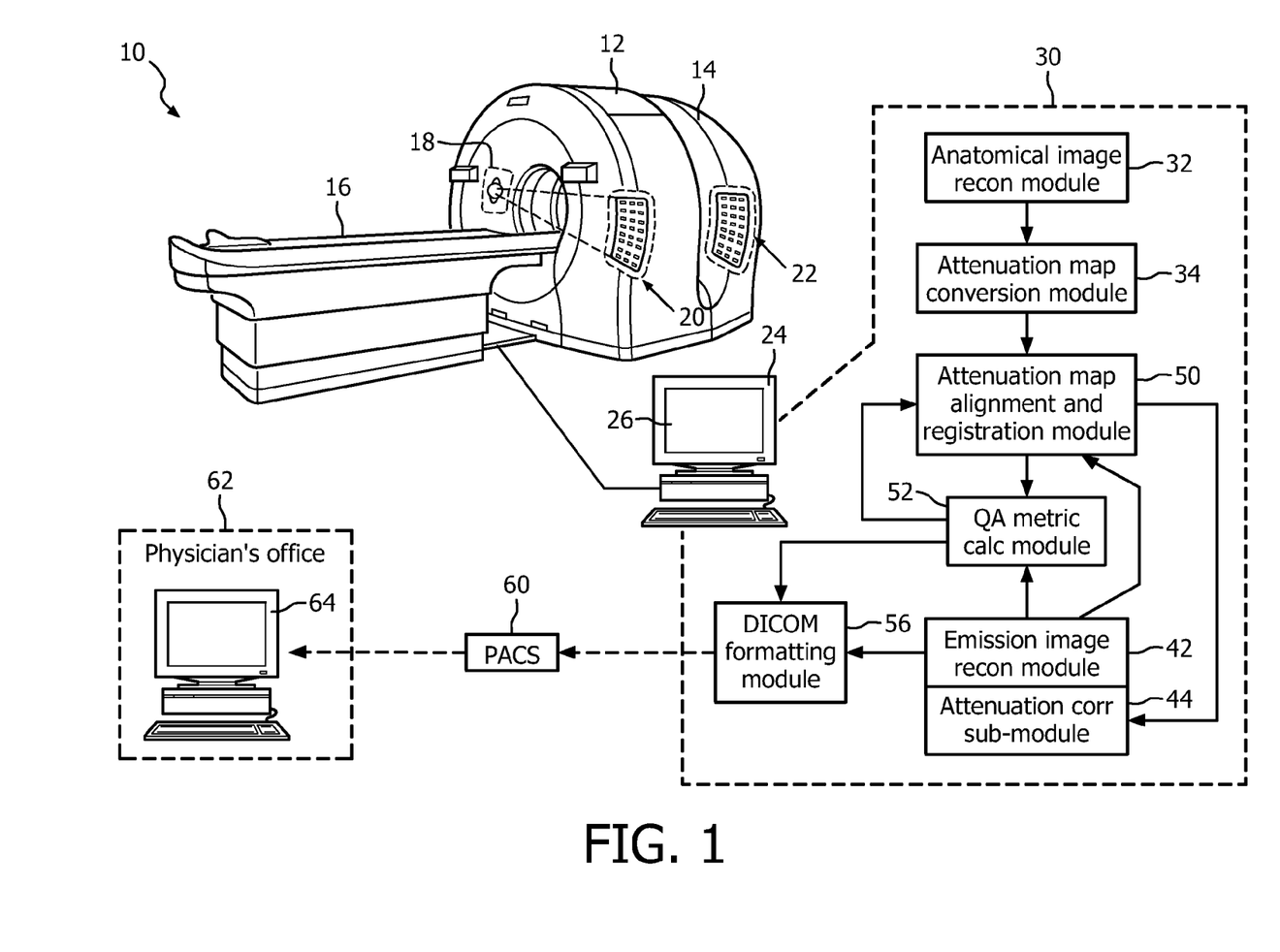
FIG. 1 diagrammatically shows a hybrid imaging system configured to perform attenuation-corrected emission (e.g., PET) imaging.

With reference to FIG. 1, an illustrative example is shown of a hybrid imaging facility configured to perform attenuation-corrected emission (e.g., PET) imaging. The illustrative facility employs a hybrid PET/CT imaging system 10 which in the illustrated embodiment is a GEMINI™ PET/CT imaging system (available from Koninklijke Philips Electronics N.V., Eindhoven, The Netherlands). The hybrid PET/CT imaging system 10 includes a transmission computed tomography (CT) gantry 12 and a positron emission tomography (PET) gantry 14. The hybrid PET/CT imaging system 10 is a "hybrid" system in that a common lineal subject transport system 16 is arranged to transport an imaging subject into either of the CT or PET gantries 12, 14. The CT gantry 12 is equipped with an x-ray tube 18 and an radiation detector assembly 20 that is sensitive to the x-rays. The internal components 18, 20 are shown by partial cutaway of the CT gantry 12. The PET gantry 14 houses a PET radiation detector assembly 22 (diagrammatically shown in part by partial cutaway of the PET gantry 14) arranged as an annular ring within the PET gantry 14. The PET radiation detector assembly 22 is sensitive to 511 keV radiation emitted by positron-electron annihilation events.

In the illustrative embodiment, the emission image is a PET image acquired by the PET gantry 14. However, the emission image can be another type of emission image acquired by suitable acquisition hardware, such as a single photon emission computed tomography (SPECT) image acquired by a gamma camera. Similarly, in the illustrative embodiment the anatomical image is a CT image acquired by the CT gantry 12. However, the anatomical image can be another type of anatomical image acquired by suitable acquisition hardware, such as a magnetic resonance (MR) image acquired by a magnetic resonance scanner. The use of a hybrid imaging system such as the illustrative hybrid PET/CT imaging system 10 is advantageous because it increases the likelihood that the as-acquired anatomical and emission image data sets will be spatially aligned or reasonably close to being spatially aligned. However, some misalignment between the emission and anatomical images is expected. One source of misalignment is subject motion, which is likely to occur to some nonnegligible extent because the emission imaging data set acquisition typically takes a few minutes to a few tens of minutes, and the anatomical imaging data set typically takes a few seconds to a few minutes to acquire. These relatively long time periods make it fairly likely that the subject may move during one or both imaging data set acquisitions.

Although a hybrid imaging system (e.g., the illustrated hybrid PET/CT imaging system 10, or a hybrid PET/MR imaging system, or a hybrid SPECT/CT imaging system, or so forth) is advantageous, it is also contemplated to acquire the anatomical imaging data set and the emission imaging data set using independent imaging systems. For example an MR image could be acquired using a stand-alone MR scanner, and a SPECT image could be acquired using a stand-along gamma camera.

The hybrid imaging facility further includes an illustrated computer 24 or other control and data processing electronics that control the hybrid imaging system 10 to acquire a CT image data set and a PET image data set of a common subject. The computer 24 or other control and data processing electronics reconstruct these data sets to generate a CT image and a PET image, respectively, with the PET image including attenuation correction performed using an attenuation map generated from the CT image. Instead of or in addition to the illustrative computer 24, the control and data processing electronics may include other hardware and associated software or firmware such as application-specific integrated circuitry (ASIC) or other dedicated hardware, a remote server accessed by a workstation disposed in the hybrid imaging facility, or so forth. Moreover, the disclosed data processing methods may be embodied as a storage medium storing instructions executable by the illustrated computer 24 or other data processing electronics to perform the disclosed data processing methods. Such a storage medium may, by way of illustrative example, include a hard drive or other magnetically-based storage medium, an optical disk or other optically-based storage medium, a random access memory (RAM), read-only memory (ROM), FLASH memory, or other electronic storage medium, or so forth.

The acquisition and image reconstruction processes are configured, initiated, and performed by a human radiologist or other imaging specialist operating the hybrid imaging system 10 and the computer 24 or other control and data processing electronics. The human radiologist or other imaging specialist views a display 26 of the computer 24 or other control and data processing electronics on which may be displayed the final attenuation-corrected emission image, or various intermediate images generated during the reconstruction operations.

With continuing reference to FIG. 1, the computer 24 or other control and data processing electronics embody a set 30 of reconstruction modules that cooperatively perform attenuation-corrected emission image reconstruction using an attenuation map generated from the anatomical image. Toward this end, an anatomical image reconstruction module 32 reconstructs the anatomical (e.g., CT) image data set to generate an anatomical (e.g., CT) image. The reconstruction module 32 can employ any suitable reconstruction technique such as filtered backprojection, iterative backprojection, or so forth. An attenuation map conversion module 34 converts the anatomical (e.g., CT) image into an attenuation map. In the illustrative case, the CT image represents attenuation for x-rays, and so conversion to an attenuation map for PET image reconstruction entails adjusting the voxel values of the CT image to reflect attenuation at the 511 keV energy of emissions from the radioactive substance (e.g., radiopharmaceutical) used in the PET imaging. As another example, to derive an attenuation map from an MR image, voxels of the MR image are suitably replaced by attenuation values for the emission radiation measured in the emission (e.g., PET)

imaging based on identification of tissue type. This latter approach can also be used to construct the absorption map from a CT image.

An emission image reconstruction module 42 is also provided to reconstruct the emission (e.g., PET) image data set to generate an emission (e.g., PET) image. The reconstruction module 42 can also employ any suitable reconstruction technique such as iterative backprojection. An attenuation correction sub-module 44 is provided to adjust the projections (or backprojections) to account for attenuation of emissions by the subject during the reconstruction process. However, such attenuation correction may produce more image degradation than improvement if the attenuation map is not well aligned with the emission image data set. Accordingly, the emission image reconstruction module 42 is first invoked without using the attenuation correction sub-module 44, so as to generate an initial emission image without attenuation correction.

The initial emission image and the attenuation map are input to an attenuation map alignment and registration module 50 that performs image segmentation of the emission image and attenuation map to facilitate alignment. The segmented images are analyzed by a quality assurance (QA) metric(s) calculation module 52 that generates a quantitative assessment or assessments, referred to herein as QA metric(s), indicative of how well the attenuation map is aligned with the emission image. If the alignment is deemed to be too poor for the attenuation map to be used by the attenuation correction sub-module 44, then the attenuation map alignment and registration module 50 performs a registration algorithm to register the attenuation map with the emission image. During this registration, the QA metric(s) are used as a figure of merit for assessing the registration.

Once a satisfactorily aligned attenuation map is obtained, the emission image reconstruction module 42 performs a second emission image reconstruction, this time invoking the attenuation correction sub-module 44 to perform attenuation correction. The final emission image with attenuation correction is preferably reviewed by the radiologist or other imaging technician for visual review and approval. Once approved, a DICOM formatting module 56 formats the final emission image with attenuation correction in a suitable format, in the illustrative embodiment a DICOM format (where "DICOM" stands for the "Digital Imaging and Communication in Medicine" standard managed by the Medical Imaging & Technology Alliance, Rosslyn, Va., USA). Although DICOM is a preferred standard, another imaging format can also be used. The DICOM formatting module 56 formats the final emission image with attenuation correction in the DICOM format which includes a DICOM header that provides selected metadata about the image. The DICOM formatting module 56 includes the QA metric(s) for the attenuation map used in the attenuation-corrected emission image reconstruction that generated the image. The formatted final attenuation-corrected emission image tagged with the QA metric(s) is suitably stored in a Picture Archiving and Communication System (PACS) 60. Optionally, the tagged final attenuation-corrected emission image tagged with the QA metric(s) is additionally or alternatively stored at a local workstation or other suitable storage location.

At some time thereafter, the physician who requested the PET imaging is informed that the imaging is completed and is provided with the image. In the illustrative embodiment, the physician residing in his or her office 62 retrieves the image from the PACS 60 and displays it on his or her office computer 64, along with a display of the QA metric(s) stored with the image. Alternatively, the radiologist or other imaging technician may print out a hardcopy of the final attenuation-corrected emission image with the QA metric(s) also printed on the hardcopy sheet and this hardcopy may be forwarded to the physician (in which case the formatting module 56 and PACS 60 may optionally be omitted). In either embodiment, the physician has the image for review, and also has the QA metric(s) for review. The physician can therefore assign appropriate clinical weight to the image, taking into account the quality of the attenuation correction as quantitatively indicated by the QA metric(s).

Figure 2:
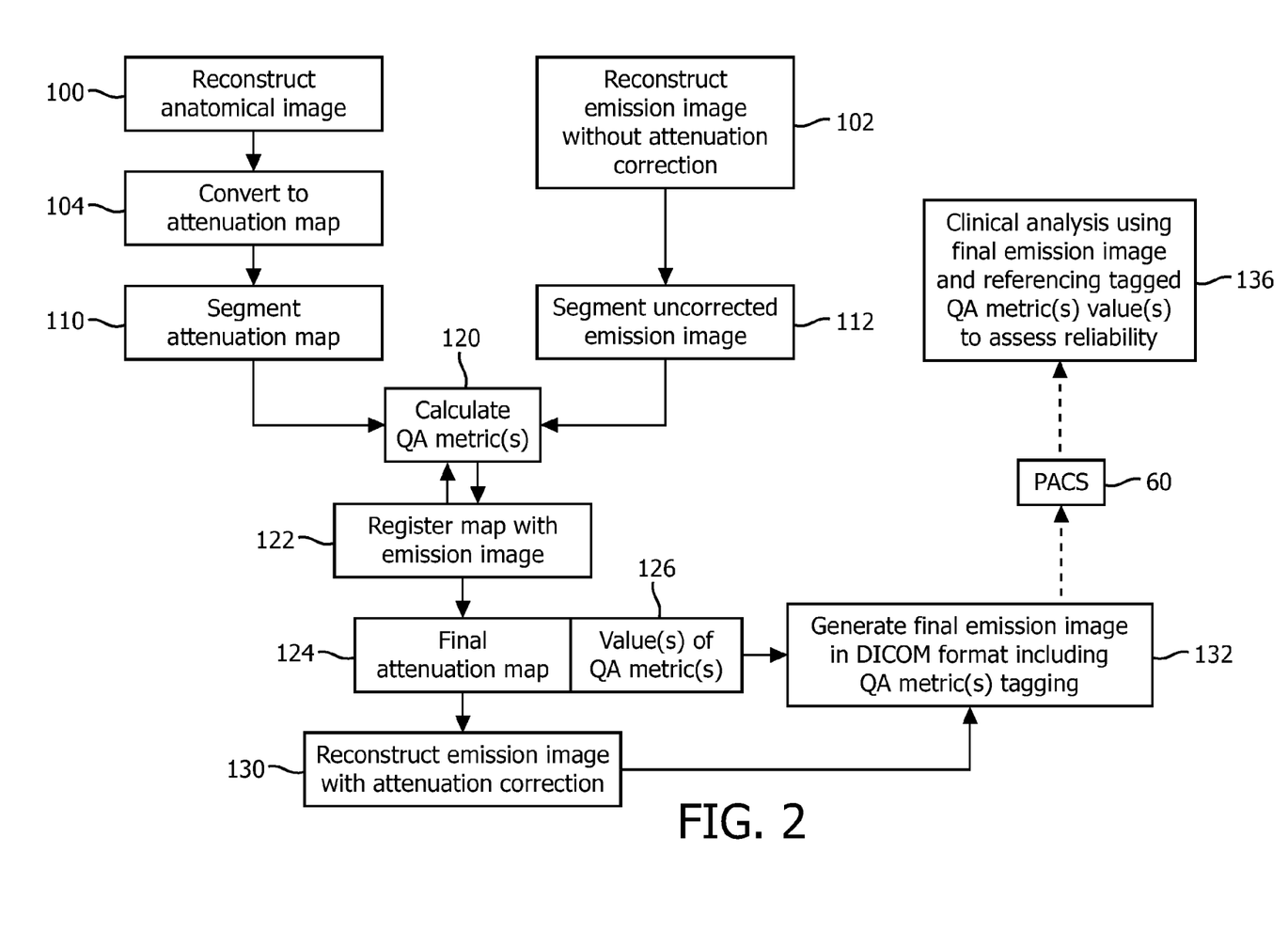
FIG. 2 diagrammatically shows an emission image reconstruction process including attenuation correction suitably performed by the system of FIG. 1.

With continuing reference to FIG. 1 and with further reference to FIG. 2, an emission image reconstruction process including attenuation correction is described. In an operation 100, the anatomical image reconstruction module 32 is invoked to reconstruct an anatomical (e.g., CT) image from an anatomical image data set acquired for a subject. In an analogous operation 102, the emission image reconstruction module 42 is invoked to reconstruct an initial emission (e.g., PET) image from an emission image data set acquired for a subject. The reconstruction operation 102 is performed without attenuation correction, and hence can be performed without an attenuation map being available. Since no attenuation correction is performed in the operation 102, the resulting initial emission image is also referred to herein as an uncorrected emission (e.g., PET) image. In an operation 104 the attenuation map generation module 34 is invoked to convert the anatomical image into an attenuation map, for example by replacing the values of the CT image that are representative of x-ray attenuation values with corresponding values representative of 511 keV attenuation values (in the case of PET). Alternatively, the operation 104 may assign attenuation values to voxels based on tissue type, where the tissue type is identified based on the CT voxel values and/or the results of the segmentation operation 110.

In operations 110, 112, the respective anatomical and uncorrected emission images are segmented to identify features of interest. In an illustrative example, the imaging is assumed to be cardiac imaging, and the features of interest include myocardium, lung fields (generally comprising mostly air), and the outer body contour. Substantially any suitable segmentation process can be employed, such as a region-growing algorithm, threshold-based segmentation, model-based segmentation, manual segmentation utilizing a graphical user interface, various combinations thereof, or so forth. The segmentation, if automated, can be fully automatic or semi-automatic (in which the radiologist or other imaging technician reviews and optionally corrects the automatic segmentation results, and may optionally also define seeds for region growing or provide other "initial values" for the segmentation algorithm). The segmentation operations 110, 112 are suitably performed by the attenuation map alignment and registration module 50.

In an operation 120, the QA metric calculation module 52 is invoked to compute values for one or more quality assurance (QA) metric(s). Various QA metric(s) can be used. In one illustrative example, value for a maximum offset QA metric is computed which quantifies the maximum distance that a feature of the emission image extends beyond a corresponding feature of the attenuation map. In the illustrative case of cardiac imaging, an alternative maximum offset QA metric is also contemplated, in which a value for the maximum offset QA metric quantifies the maximum distance that a myocardium feature of the emission image extends into a lung field feature of the attenuation map. This alternative maximum offset QA metric recognizes that substantial artifacts tend to result in the attenuation-corrected emission image if the attenuation map misidentifies myocardial tissue as part of the lung field, or vice versa.

Another contemplated QA metric is a non-concordance QA metric. The value for the non-concordance QA metric quantifies a portion (e.g., percentage or fraction) of a feature of the emission image extending outside of a corresponding feature of the attenuation map. For the illustrative case of cardiac imaging, the value for the non-concordance QA metric suitably quantifies the percentage or fraction of a myocardium feature of the emission image extending outside of a corresponding myocardium feature of the attenuation map.

The QA metric(s), e.g. the maximum offset QA metric and the non-concordance QA metric, provides quantitative assessment of the alignment of the attenuation map with the uncorrected emission image. In some instances, the QA metric(s) may indicate that the alignment is satisfactory. This may be the case, for example, when the emission and anatomical image data sets were acquired using a hybrid imaging system having the same or correlated subject coordinate systems and the subject remained substantially stationary during the data set acquisitions. In such a case, a map registration operation 122 is not invoked, and a final attenuation map 124 is identical with the attenuation map output by the conversion operation 104.

In some instances, however, the QA metric(s) may indicate that the alignment between the attenuation map and the uncorrected emission image is not satisfactory. This may be the result of subject motion, or the use of different and uncorrelated imaging systems for acquiring the anatomical and emission image data sets, or so forth. In such instances, the map registration operation 122 is performed to spatially register the attenuation map with the uncorrected emission image in order to generate the final attenuation map 124. Substantially any type of rigid registration, or any type of non-rigid registration, may be used to perform the registration operation 122. The registration may be automated, manual, or semi-automated. In some embodiments disclosed herein, the registration is a two-step registration, employing a first global rigid registration followed by a second local non-rigid registration. The second registration step may, for example, employ mesh warping in which the warped mesh is localized to the myocardial feature (in the illustrative case of cardiac imaging). After registration by the operation 122, process flow returns to the QA metric(s) calculation operation 120 to recalculate the QA metric(s) using the updated (i.e., registered) attenuation map.

Indeed, in some iterative registration embodiments the QA metric(s) calculated in the operation 120 are used as a figure-of-merit to be optimized by the registration, in which case process flows back to the operation 120 to update the QA metric(s) after each iteration of the iterative registration process. For example, in a manual iterative registration approach, the user manually adjusts (e.g., shifts and/or rotates) the attenuation map and then clicks on a GUI interface button (or provides some other user input) to cause the computer 24 to reexecute the operation 120 to update the value(s) of the QA metric(s) so as to assess the improvement (if any) in the alignment due to the manual adjustment. This process can be iteratively repeated to manually reduce the QA metric(s) value(s) and thereby improve the alignment of the attenuation map.

The final attenuation map 124 (whether obtained with or without invoking the registration operation 122) serves as input to a last (and possibly only) execution of the QA metric(s) calculation operation 120 so as to generate QA metric(s) value(s) 126 quantifying alignment of the (final) attenuation map 124 with the uncorrected emission image. In an operation 130, the emission image reconstruction module 42 is again invoked to reconstruct the emission image data set but this time including attenuation correction provided by invoking the attenuation correction sub-module 44 in conjunction with the (final) attenuation map 124 to correct projections (or backprojections) for attenuation of the emissions. The output of the reconstruction operation 130 is a final emission image with attenuation correction.

The final emission image with attenuation correction differs (in general) from the initial uncorrected emission image generated by operation 102 in that the final emission image includes the attenuation correction. However, this attenuation correction is not expected to substantially affect the alignment between the attenuation map and the emission image. Accordingly, the QA metric(s) value(s) 126 quantifying alignment of the final attenuation map 124 with the uncorrected emission image is also expected to quantify alignment of the final attenuation map 124 with the final emission image with attenuation correction. Accordingly, in an operation 132 the final emission image is formatted in a DICOM format with a DICOM header containing metadata about the final emission image including the QA metric(s) value(s) 126. (More generally, the operation 132 generates a data unit by formatting the final emission image in a format that includes an image metadata structure containing metadata pertaining to the emission image wherein the formatting includes metadata representing the calculated QA metric(s) values(s) 126 in the image metadata structure).

Alternatively, the operation 120 can be executed one additional time after the second reconstruction operation 130 using the final attenuation map 130 and the final emission image with the attenuation correction as inputs, so as to generate QA metric(s) value(s) that are still more precisely representative of the alignment between the final attenuation map 130 and the final emission image. The QA metric(s) value(s) calculated by this last execution of the operation 120 are then stored with the final image in the DICOM format by the operation 132.

The DICOM-formatted (or otherwise-formatted) final emission image with the QA metric(s) values(s) 126 tagged as metadata is stored in the PACS 60 (or, more generally, is stored in an image storage), and is later retrieved from the PACS 60 (or other image storage) by the physician who then performs clinical analysis 136 using the final emission image and referencing the tagged QA metric(s) value(s) to assess reliability. Alternatively, the final emission image may be printed as a hardcopy with the QA metric(s) values(s) 126 printed on the sheet of the hardcopy, and the hardcopy is physically delivered to the physician who then performs the clinical analysis 136. In either case, it will be appreciated that in most embodiments the clinical analysis 136 will be performed at a later time and in a different location from the radiology laboratory or other facility at which the imaging including the QA metric(s) calculating operation 120 is performed. It is by tagging (or printing) the value(s) of the QA metric(s) 126 with the final image that these values are made readily available to the physician performing the clinical analysis 136.

For the illustrative maximum offset and non-concordance QA metrics, small values of both QA metrics indicate adequate alignment for accurate attenuation correction of the emission data. Larger values of these illustrative QA metrics indicate that the physician should be aware of possible artifacts. In some embodiments in which the emission and anatomical image data sets are stored in the PACS 60 or elsewhere (or in which equivalent information such as losslessly reconstructed images are stored), the physician may request that the reconstruction be repeated, either without attenuation correction or with attenuation correction but with better registration of the attenuation map.

In the illustrative example of FIG. 2, the anatomical image is converted to the attenuation map, and then the QA metric(s) are calculated 120 and registration 122 is performed if appropriate. However, it is also contemplated to compute the QA metric(s) and perform the registration as appropriate using the anatomical image, and then to convert the registered anatomical image to generate the attenuation map. In such embodiments, the anatomical image (without conversion) is segmented and serves as input to the QA metric(s) calculation operation 120, and registration (if performed) operates to rigidly and/or non-rigidly adjust the anatomical image. In these alternative embodiments, once a final anatomical image (with registration adjustment if appropriate) is arrived at, then is the conversion module 34 applied to generate the attenuation map.

Figure 3:
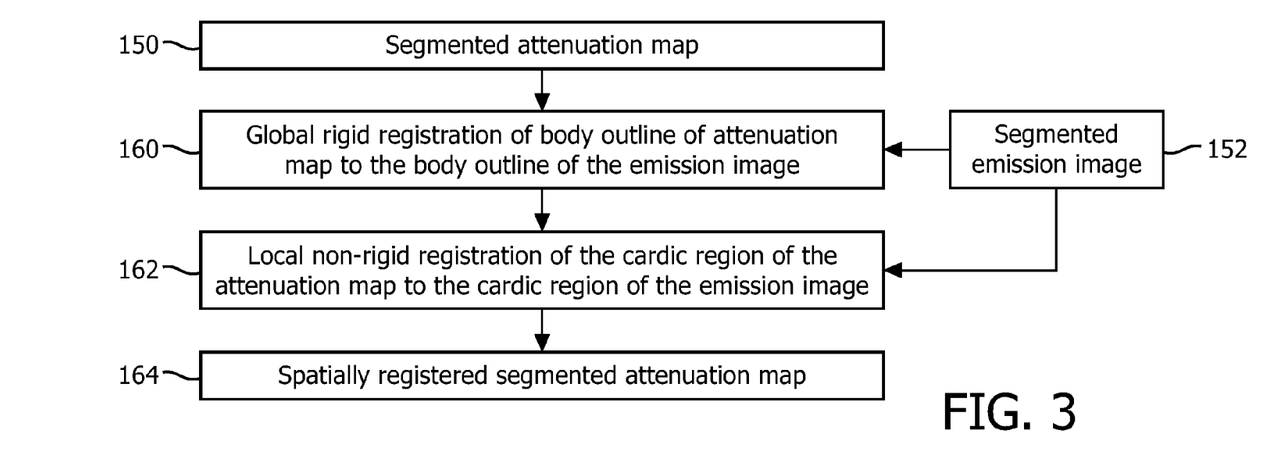
FIG. 3 diagrammatically shows an illustrative example of a suitable registration process for registering an attenuation map to an emission image.

With reference to FIG. 3, another illustrative example is provided, which particularly illustrates a suitable two-step global rigid/local non-rigid registration approach for performing the registration operation 122. In this example the emission image data set is assumed to be a SPECT image data set, while the anatomical image data set is again a CT image data set. This example assumes the existence of an (unregistered) segmented attenuation map 150 and a segmented initial emission image 152. Assessment of the alignment (or, equivalently, detection of misalignment) starts in this example by extracting a region representing the heart within the emission image 152. In this example, the segmentation of the attenuation map 150 includes identifying a "safety region", which represents the inner area within which the heart is expected to be located (according to the attenuation map values found there).

In a first global registration operation 160, a rigid shift (optionally also including a rigid rotation) is performed to optimize the match of body contours in the attenuation map 150 and the initial emission image 152. This is followed by a second registration step 162 that performs a local non-rigid registration aligning the inner cardiac region (for the illustrative example of cardiac imaging), while leaving the remainder of the image outside of this local cardiac region unchanged. In some suitable embodiments, the local non-rigid registration employs an elastic deformation or warping algorithm, which corrects the shape of the attenuation map in the cardiac region such that the heart region approaches but does not interfere with the lung or the ribcage. The output of the second registration step 162 is a spatially registered segmented attenuation map 164, which is suitably input back to the QA metric(s) calculation operation 120 to assess the (registered) alignment and is also used in attenuation correction in the reconstruction operation 130.

In some embodiments, the heart region focused on in the second registration step 162 may be excluded from deriving registration match measures used in the first registration step 160. Otherwise, depending on the registration method applied, the heart region may have a substantial impact on the quality of the global registration 162, as local mismatch in the heart region may introduce a high negative match score contribution. However, once the parameters for the rigid registration have been derived, the global registration 160 is applied globally, that is, the rigid shift or rotation performed in the first registration 160 includes the heart region which was excluded in computing the registration match parameters. Said another way, in the operation 160 the heart region may optionally be excluded when computing the magnitude/direction of the rigid shift and/or rotation, but the actual rigid shift/rotation is applied globally including to the heart region.

With continuing reference to FIG. 3, some embodiments of the illustrative two-step registration, as well as the preceding segmentation, are described in further detail. Considering first the emission image 152, before segmenting the heart's left ventricle the region for the segmentation processing is optionally limited to avoid inadvertently segmenting nearby "hot" regions (that is, regions of high emission in the emission image) such as the liver or gall bladder. For this spatial pre-selection a piecewise linear curve can be fit to the function representing the accumulated emission activity in each axial slice and analyzing the (characteristic) locations of the transition points between the linear segments. By such an approach an axial slice is found which contains the heart as hottest region. Starting from one of the heart voxels within this slice, the entire heart (left ventricle) is segmented, for example using a region growing algorithm, using the voxel value as an indicator for the required threshold parameter. Alternatively, a model-based segmentation algorithm or other segmentation algorithm may be used.

Considering next segmentation of the attenuation map, threshold segmentation based on a range classifier for typical attenuation values can be applied to derive a binary mask for an inner "safety" region which represents the inner area within which the heart is expected to be located. In order to derive an appropriate threshold value, a Gaussian function is suitably fitted to the rightmost peak (representing the larger grey scale values) of the histogram generated from the entire attenuation map. The range classifier for the identification of the soft tissue region can then be derived, for example directly from the full-width-at-half-maximum (FWHM) of this Gaussian peak. To further select only the relevant inner body portion and to exclude tissue located outside the ribcage, some further processing is optionally employed. For example, a lung field image can be generated in order to more accurately define the safety region, based on the assumption that the lung is always surrounded by the outer soft tissue. Using that as an additional criterion to remove the outer soft tissue and from the known location of the lungs the location of the myocardium in-between can be derived. Further, morphologic operations are optionally applied on the intermediate result, in order to preserve topological coherence of the safety region while removing small gaps or discontinuities. Once the foregoing segmentation processing (or other suitable segmentation processing) is completed, the global rigid registration step 160 is performed.

To provide a more precise specification of the cardiac misalignment, the volume region indicating misalignment for the second step 162 is quantified by locating voxels of the binary heart detected from emission data which are not located in the safety region. The total number or percentage of these voxels can be quantified (corresponding to the non-concordance QA metric), or other characteristics can be quantified such as a metric of the specific spatial distribution (for example, represented by the maximum offset QA metric). Such QA metrics are suitably used as an indicator or indicators of the extent of misalignment.

Figure 4:
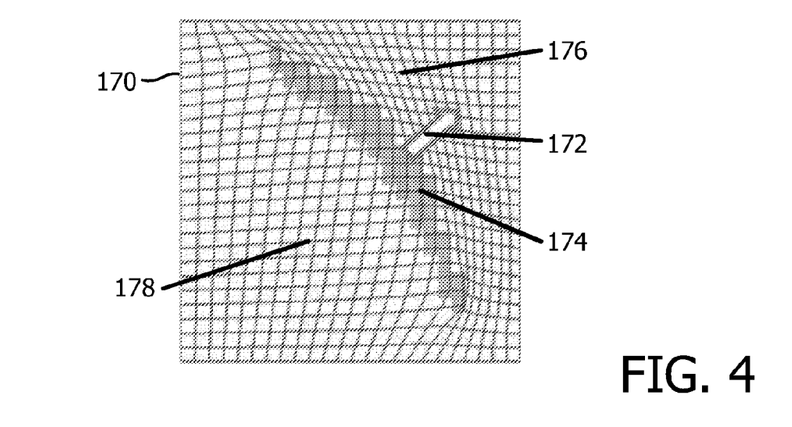
FIG. 4 diagrammatically shows an illustrative example of a suitable non-rigid mesh-warping approach for the local non-rigid registration employed in the registration process of FIG. 3.

With continuing reference to FIG. 3 and with further reference to FIG. 4, some regional warping or deformation approaches for performing the local non-rigid registration operation 162 are set forth. FIG. 4 illustrates a local region defined by a constant border 170, within which non-rigid registration by regional warping is performed. A rectangular local region is illustrated, but circular, oval, irregular, or other local region geometries are also contemplated. To initiate a deformational adjustment, an optimal drag vector 172 is identified. The direction of the optimal drag vector 172 can be derived from the (outer) surface normal of the (curved) region represented by all the heart voxels detected outside the safety region (OSR). Optionally, morphological filtering is applied to ensure that the curved region does not contain any holes. Then a region R around the heart is (automatically) specified, limiting the spatial area, where the subsequent attenuation map deformation or warping is effective. Within this region, attenuation values are changed in an elastic manner to produce the non-rigid registration.

Figure 5:
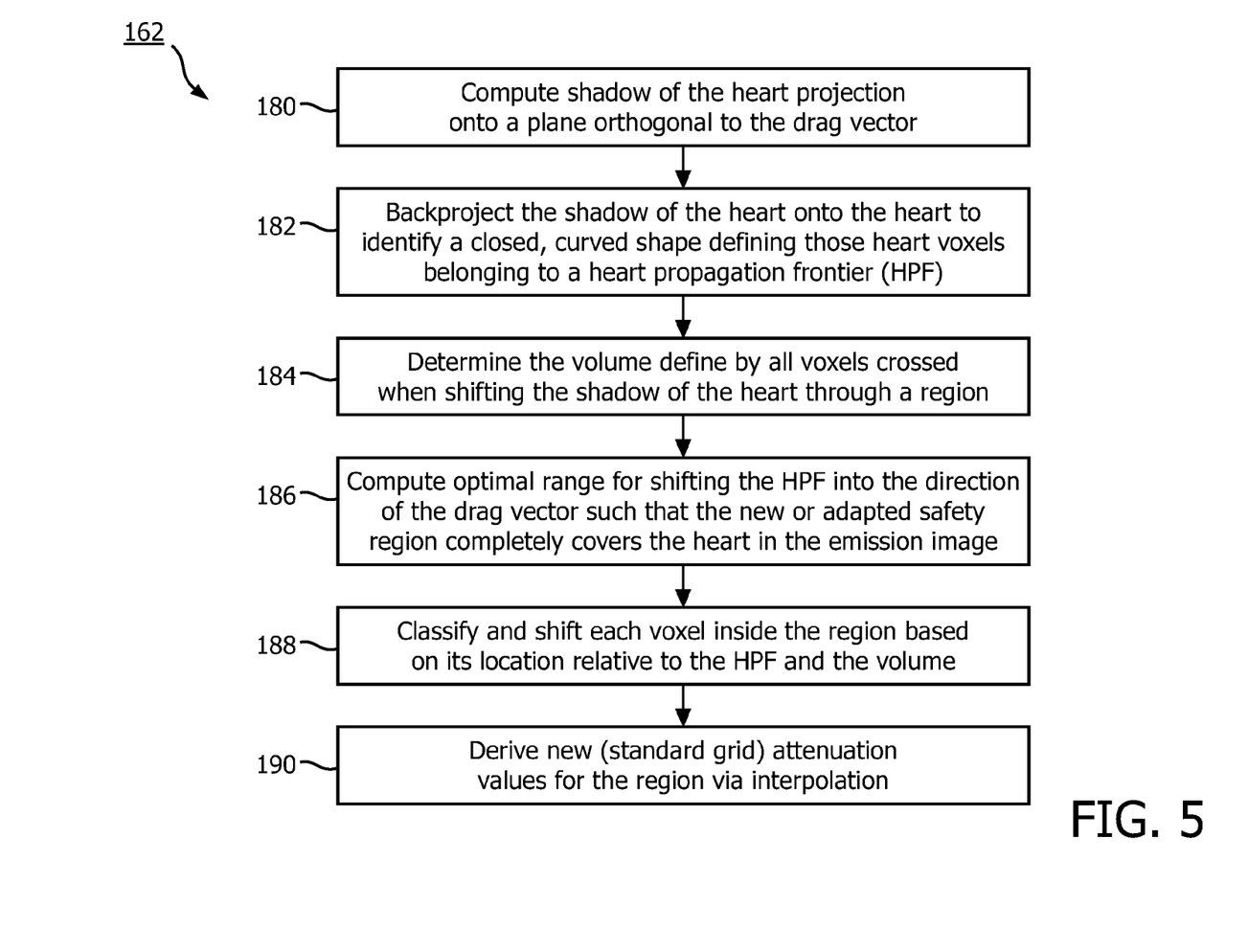
FIG. 5 diagrammatically shows a suitable method for the local non-rigid registration employed in the registration process of FIG. 3.

With continuing reference to FIGS. 3 and 4 and with further reference to FIG. 5, in one suitable embodiment in which the operation 162 performs non-rigid registration by warping or deformation the following steps are followed. In a step 180, the shape (or "shadow") (denoted S) of the heart projection onto a plane orthogonal to the drag vector is computed. In a step 182, the shadow S is back-projected onto the heart again to identify a closed, curved shape defining those heart voxels belonging to a heart propagation frontier (HPF) 174. The voxels belonging to the HPF 174 are indicated by gray shading in FIG. 4. In a step 184, the volume (denoted V) defined by all those voxels crossed when shifting the shadow S through a region (denoted R) using the drag vector 172 is determined. In a step 186, the optimal (e.g., minimal) range for shifting the HPF into the direction of the drag vector is computed, such that afterwards the new or adapted safety region completely covers the heart in the emission image. In a step 188, each voxel inside the region R is classified and shifted depending on its location relative to the HPF and the volume V according to the following algorithm: (A) voxels 176 that are in front of the HPF 174 are compressed in the direction of the drag vector 172; (B) voxels belonging to the HPF 174 are shifted in the direction of the drag vector 172 according to the optimal range determined in step (4); and (C) voxels 178 that are behind the HPF 174 are stretched in the direction of the drag vector 172. In order to preserve the smooth transition between neighboring structures when executing the step 188, pixels outside the volume V are also dragged into the direction of the drag vector 172. However, their shift range is individually set depending on, for example, their distance to the surface of the volume V. Various functions may be used in setting this (radial) distance dependency, such as linear, sigmoidal or Gaussian-like curve functions. In a step 190, the new (standard grid) attenuation values for the region R are derived via suitable interpolation.

In a variant approach, the non-rigid regional modifications and the impact on the surrounding voxel locations is represented as a three-dimensional spring-mass model. In another variant approach, the entire safety region (and the attenuation map) is shifted in a media-dorsal direction until the heart boundary just starts to exceed the boundary region leading to a soft misalignment and thus an OSR develops. The OSR is then dragged as per operation 162, but in the opposite direction, resulting in a shrinking of the safety region.

Various additional or alternative pre-processing steps are contemplated for the registration processing. For example, a correction for streak artifacts in the attenuation map may optionally be performed before extracting the safety region. This can be advantageous since streak artifacts might be locally misinterpreted as an incorrect tissue type or types so as to result in non-physiological distortions during the non-rigid registration operation 162. Some suitable streak correction algorithms include topological or median algorithms, filtering algorithms, histogram analysis-based modification of local attenuation values, Hough-transform based streak correction approaches, or so forth.

This application has described one or more preferred embodiments. Modifications and alterations may occur to others upon reading and understanding the preceding detailed description. It is intended that the application be construed as including all such modifications and alterations insofar as they come within the scope of the appended claims or the equivalents thereof.

Having thus described the preferred embodiments, the invention is now claimed to be:

1. A method comprising:
    generating an attenuation map from an anatomical image data set acquired of a subject;
    reconstructing an emission image data set acquired of the subject to generate an emission image, the reconstructing including correcting for attenuation of emission radiation in the subject using the attenuation map;
    calculating a value for a quality assurance metric quantifying alignment of the attenuation map with the emission image;
    storing the emission image and the calculated quality assurance metric in an image storage;
    subsequent to the storing, retrieving an instance of the emission image and an instance of the calculated quality assurance metric from the image storage; and
    displaying or printing the retrieved instance of the emission image together with the retrieved instance of the calculated quality assurance metric.

2. The method as set forth in claim 1, wherein the generating an attenuation map comprises:
    reconstructing the emission image data set to generate an initial emission image; and
    registering with the initial emission image one of (i) an anatomical image reconstructed from the anatomical image data set and (ii) the attenuation map.

3. The method as set forth in claim 2, wherein the registering comprises:
    performing a global rigid registration; and
    after the global rigid registration, performing a local non-rigid registration of a region of interest.

4. The method as set forth in claim 3, wherein the performing a local non-rigid registration comprises:
    performing a mesh warping registration.

5. The method as set forth in claim 2, wherein the registering comprises:
    employing the quality assurance metric as a figure of merit in the registering.

6. The method as set forth in claim 1, wherein the calculating comprises:
    calculating a value for a maximum offset quality assurance metric quantifying the maximum distance that a feature of the emission image extends beyond a corresponding feature of the attenuation map.

7. The method as set forth in claim 1, wherein the calculating comprises:
    calculating a value for a maximum offset quality assurance metric quantifying the maximum distance that a myocardium feature of the emission image extends into a lung field feature of the attenuation map.

8. The method as set forth in claim 1, wherein the calculating comprises:
    calculating a value for a non-concordance quality assurance metric quantifying a portion of a feature of the emission image extending outside of a corresponding feature of the attenuation map.

9. The method as set forth in claim 1, wherein the calculating comprises:
    calculating a value for a non-concordance quality assurance metric quantifying a portion of a myocardium feature of the emission image extending outside of a corresponding myocardium feature of the attenuation map.

10. The method as set forth in claim 1, wherein the calculating receives a first input consisting of:
one of the emission image and an uncorrected emission image generated by reconstructing the emission image data set without correcting for attenuation,
and a second input consisting of:
one of an anatomical image reconstructed from the anatomical image data set, the attenuation map, an anatomical image reconstructed from the anatomical image data set and registered with the emission image data set, and the attenuation map after registration with the emission image data set.

11. The method as set forth in claim 1, further comprising:
formatting the emission image in a storage format that includes an image metadata structure containing metadata pertaining to the emission image;
during the formatting, including metadata representing the calculated quality assurance metric in the image metadata structure; and
storing in an image storage the emission image in the storage format including the image metadata structure containing the metadata representing the calculated quality assurance metric.

12. The method as set forth in claim 1, further comprising:
acquiring the anatomical image data set of the subject using one of transmission computed tomography (CT) imaging and magnetic resonance (MR) imaging.

13. The method as set forth in claim 1, further comprising:
acquiring the emission image data set of the subject using one of positron emission tomography (PET) imaging and single photon emission computed tomography (SPECT) imaging.

14. An apparatus comprising:
data processing electronics configured to perform a method including:
generating an attenuation map from an anatomical image data set acquired for a subject;
reconstructing an emission image data set acquired for the subject to generate an emission image, the reconstructing including correcting for attenuation of emission radiation in the subject using the attenuation map;
calculating a value for a quality assurance metric quantifying alignment of the attenuation map with the emission image; and
constructing a data unit comprising the emission image and metadata representing the calculated quality assurance metric.

15. The apparatus as set forth in claim 14, wherein the generating an attenuation map comprises:
reconstructing the emission image data set without correcting for attenuation to generate an uncorrected emission image; and
registering with the uncorrected emission image one of (i) an anatomical image reconstructed from the anatomical image data set and (ii) the attenuation map, the registering including performing a global rigid registration and, after the global rigid registration, performing a local non-rigid registration of a region of interest.

16. The apparatus as set forth in claim 14, wherein the calculating comprises at least one of:
calculating a value for a maximum offset quality assurance metric quantifying the maximum distance that a selected feature of the emission image extends one of beyond and into a selected feature of the attenuation map, and
calculating a value for a non-concordance quality assurance metric quantifying a portion of a feature of the emission image extending outside of a corresponding feature of the attenuation map.

17. A non-transitory storage medium storing instructions executable by data processing electronics to perform a method including:
generating an initial emission image by reconstructing an emission image data set acquired for the subject;
generating an attenuation map from an anatomical image data set acquired for a subject, the generating including registering with the initial emission image one of (i) an anatomical image reconstructed from the anatomical image data set and (ii) the attenuation map, the registering including performing a global rigid registration followed by a local non-rigid registration of a region of interest; and
reconstructing the emission image data set to generate an attenuation-corrected emission image, the reconstructing including correcting for attenuation of emission radiation in the subject using the generated attenuation map.

18. The non-transitory storage medium as set forth in claim 17, wherein the generating an initial emission image comprises:
generating the initial emission image by reconstructing the emission image data set acquired for the subject without correcting for attenuation of emission radiation in the subject.

19. The non-transitory storage medium as set forth in claim 17, wherein the performing a local non-rigid registration comprises:
performing a mesh warping registration.

* * * * *